(12) United States Patent
Miyagi et al.

(10) Patent No.: US 7,335,290 B2
(45) Date of Patent: Feb. 26, 2008

(54) PROCESSING METHOD FOR NANO-SIZE SUBSTANCE

(75) Inventors: Kei Miyagi, Sappro (JP); Keiji Kunimatsu, Sappro (JP)

(73) Assignee: Kabushikikaisha Equos Research, Tokyo (JP)

( * ) Notice: Subject to any disclaimer, the term of this patent is extended or adjusted under 35 U.S.C. 154(b) by 566 days.

(21) Appl. No.: 10/321,444

(22) Filed: Dec. 18, 2002

(65) Prior Publication Data

US 2003/0217933 A1    Nov. 27, 2003

(30) Foreign Application Priority Data

| May 24, 2002 | (JP) | ............................. 2002-150476 |
| Aug. 2, 2002 | (JP) | ............................. 2002-226140 |
| Aug. 2, 2002 | (JP) | ............................. 2002-226152 |

(51) Int. Cl.
  *C30B 30/02*    (2006.01)
(52) U.S. Cl. ..................................................... 205/687
(58) Field of Classification Search ................. 205/687
  See application file for complete search history.

(56) References Cited

U.S. PATENT DOCUMENTS 3,990,910 A  *  11/1976  Giner et al. ................. 429/59
5,698,175 A  *  12/1997  Hiura et al. ............. 423/447.1

FOREIGN PATENT DOCUMENTS

| JP | 06-025896 | | 2/1994 |
| JP | 06025896 A | * | 2/1994 |
| JP | 07-048110 | | 2/1995 |
| JP | 2595903 | | 1/1997 |
| JP | 2616699 | | 3/1997 |
| JP | 2002-121014 | | 4/2002 |
| WO | WO 9839250 A1 | * | 9/1998 |

OTHER PUBLICATIONS

Lou et al., "Fullerene Nanotubes in Electric Fields", Physical Review B. vol. 52, No. 3, Jul. 15, 1995, pp. 1429-1431.*
Venema et al., "Length Control of Individual Carbon Nanotubes by Nanostructuring with a Scanning Tunneling Microscope", Appl. Phys. Lett., vol. 71, No. 18, Nov. 3, 1997, pp. 2629-2631.*

(Continued)

*Primary Examiner*—Edna Wong
(74) *Attorney, Agent, or Firm*—Bacon & Thomas, PLLC

(57) ABSTRACT

An active portion of a nano-size element is selectively destroyed by applying an electric potential to the nano-size element having a carbon network structure of carbon as an outer shell while immersed in an electrolytic solution. For example, an electric potential of 1.20 to 1.60 V (RHE) is applied to the carbon nanotubes in electrolytic solution so as to oxidize the active portion in each carbon nanotube and to thereby selectively remove the ends. Consequently, an open end is created in the carbon nanotube.

7 Claims, 7 Drawing Sheets

OTHER PUBLICATIONS

Chen et al., "Electrochemical Synthesis of Polypyrrole Films Over Each of Well-Aligned Carbon Nanotubes", Synthetic Metals (no month, 2001), vol. Data 2002, vol. 125, No. 3, pp. 289-294. Abstract Only.*

Chemical Physics Letters 340 (2001) 473-478, no month, Nagasaka et al., "High-Pressure $^{129Xe}$ NMR Study of Supercritical Xenon Interacting with Polymers".

Chemical Physics Letters vol. 136, Nos. 3,4, 314-318 (1987), no month, Demarquay et al., "$^{129Xe}$ NMR of Xenon Absorbed on Zeolites, Relationship Between the Chemical Shift and the Void Space".

Liu, Pei Fang and Hu, Jun Fu "Modification of Carbon Nanotube Powder Microelectrode and Nitrate Reduction", *Chinese Chemical Letters*, vol. 13, No. 1, pp. 79-82 (2002) no month.

* cited by examiner

CARBON OF FIVE-MEMBERED RING IS ACTIVE.

(A)

(B)

PROCESSING METHOD FOR NANO-SIZE SUBSTANCE

BACKGROUND OF THE INVENTION

The present invention relates to a method for processing a nano-size element having a carbon network structure as its outer shell and more particularly, to a method for opening the ends of carbon nanotubes.

A carbon nanotube, which is a carbon material having a stereo structure, a nano-size and has carbon network structure as its outer shell, is formed according to well known methods such as the arc discharge method, laser evaporation method or chemical vapor deposition (CVD) technique.

Further, the metallic behavior, electric characteristics such as semiconductor-like behavior and mechanical characteristics including excellent strength combined with light weight, as well as its peculiar structure, have led to a large amount of research directed to carbon nanotubes. Using those characteristics, a wide application is expected in hydrogen, methane absorbing material, selectively absorbing material for use for gas separation based on the pressure swing adsorption method (PSA) or the like, material of fuel cell electrode, material of electrochemical supercapacitor electrode, material of highly functional lithium cell anode, nanodevices and light weight, high-strength composite material. In fact, actual use thereof has already started, for example, admixed with resin, in trays for supporting electronic parts and automobile mounting parts.

Carbon nanotubes include single-walled carbon nanotubes having a single carbon layer structure and multi-walled carbon nanotubes having a two or more carbon layer structure.

The above-mentioned single-walled carbon nanotube is formed with its terminal ends closed by fullerene semi-sphere and, to incorporate some substance into its interior space, these ends need to be removed.

To remove the terminal ends, conventionally, an oxidative acid solution such as nitric acid, or mixed acid is used for reaction with the carbon nanotube. Various chemical reactions, mainly oxidizing reactions, selectively occur at the terminal ends of the carbon nanotube, so that the ends are removed. The principle of this method is considered to be based on the fact that the chemical reactivities of the five-membered ring and six-membered ring composing the carbon nanotube are different in that the five-membered ring has a higher chemical reactivity than the six-membered ring. Alternatively, irradiating with ultrasonic wave so as to increase reactivity (applying ultrasonic vibration selectively destroys the terminal end of the carbon nanotube) or oxidizing at about 400° C. in dry air may be employed.

These methods not only remove the terminal ends, but also oxidize (burn) the nanotube over a wide area, thereby creating the possibility of lower yield or that the peculiar nanotube structure may be destroyed. Thus, although the oxidizing reaction needs to be accurately controlled to remove the ends of carbon nanotubes, the conventional methods are incapable of providing such accurate control.

Further, processes for opening carbon nanotubes individually are not profitable industrially. Therefore, in the present invention, carbon nanotubes are treated as an aggregate and it is intended to remove the ends from each carbon nanotube composing that aggregate. The removal of the ends of carbon nanotubes involves selectively oxidizing the terminal ends because the terminal end of a carbon nanotube has a larger structural distortion than its side portion so that it is more highly reactive in oxidation.

Further, the present invention intends to destroy a specific portion in nano-size substance having a carbon network structure as its outer shell to change the characteristic of the nano-element, thereby enabling new applications.

If the oxidizing conditions are strong (the oxidizing depends on concentration of oxidizing agent, reaction time, heating temperature and the like), the nanotube itself is destroyed, so that best use of the peculiar structure of the nanotube may not be achieved.

In case of heat treatment, for example, uniform oxidation is difficult to achieve, not only for the entire nanotube aggregate, but also at the nano-scale level, because activity of oxygen molecules is essentially at a micro level and because of a temperature gradient in a sample (there is a possibility that a sufficiently oxidized portion and not so oxidized portion may be produced because a temperature differential is created in the sample).

SUMMARY OF THE INVENTION

Accordingly, in order to open carbon nanotubes by oxidative treatment more selectively, the present invention adopts an electrochemical treatment.

If electrochemical oxidation treatment is carried out with a predetermined potential, the ends of the carbon nanotube are oxidized and removed selectively so as to obtain an open-ended carbon nanotube. The reason for this is that an ideally straight single-walled nanotube closed with fullerene semi-spheres has a total of 12 five-membered rings at both ends of the tube as shown in the structure of FIG. 1. A carbon of the five-membered ring has a larger distortion in the $sp^2$ hybrid orbital (having a bond angle of 120° in the same plane) than the six-membered ring and is less stable in terms of energy, so that it is more highly active in a chemical reaction and therefore more likely to be oxidized.

If an electric potential is applied intermittently, the efficiency of destruction of active portion of the nano-element is improved. In other words, if the electric potential is applied continuously, as the reaction progresses, water absorbed at the surface of nano-element is consumed and the current flow is stopped. On the other hand, if electric potential is interrupted, water molecules are able to migrate to the surface of the nano-element so that water is supplied. Then, if the electric potential is applied again, current flow is started. Repeating this procedure enables the processing time to be shortened.

Interrupting the supply of the electric potential reduces any difference in water distribution between a region likely to be supplied with water molecules and a region unlikely to be supplied, so that uniform treatment of the entire nanotube aggregate, which is an objective of the present invention, is achieved.

If the migration of water molecules is secured, the intermittent application of the electric potential is not restricted to any particular type. For example, a pulse-like potential can be applied. Alternatively, a sine wave-like potential can be applied with its maximum amplitude equal to the aforementioned oxidizing potential.

In the intermittent application, when no potential is applied, it does not have to be 0 V (RHE) but can be less than the aforementioned oxidizing potential (1.0 V (RHE)). Further, this applied voltage can be on the side of a reduction potential (negative potential).

It is considered that an actual carbon nanotube includes a seven-membered ring and the seven-membered ring is more likely to be oxidized for the same reason as the five-membered ring (as compared to the six-membered ring).

Thus, if the applied potential is controlled precisely, only the five-membered ring or the seven-membered ring is selectively oxidized. Further, this applied potential can be controlled with high accuracy by using a potentiostat.

Because the aggregate (electrode) of the carbon nanotubes has a small resistance (less than 1Ω), the differential in potential distribution through the entire carbon nanotube aggregate is small. Because uniform potential is applied to the entire aggregate, the oxidizing reaction occurs uniformly, so that opening of the carbon nanotubes is carried out uniformly in the aggregate. As a result, a uniform oxidation reaction, i.e. restricted to a small range, which is difficult in the conventional acid treatment or heat treatment.

Consequently, accurate reaction control, necessary for removing the ends of the carbon nanotubes in aggregate, is made possible.

If an electric potential for reducing the carbon nanotube is supplied, it is possible to selectively reduce the end portion and destroy or remove it, as in the case of oxidation mentioned above.

An apparatus for removing the nanotube ends includes, for example, a carbon nanotube aggregate formed into an electrode and a platinum counter electrode. The oxidizing potential applied to the nanotube electrode is a pulsed potential in a range of 1.00 to 1.60V (RHE: potential with respect to equilibrium hydrogen electrode; the "RHE" is omitted in some places in this specification) is applied so as to oxidize part of the carbon nanotubes, removing their ends. More preferably, the oxidizing potential is 1.20 V to 1.60 V (RHE).

Conversely, in case of reducing part of the carbon nanotube, its reduction potential is in a range of −0.5 to −1.5 V.

To establish the electric potential range, it is necessary to use a gold mesh, glassy carbon or like electrochemically stable substance as a wiring which makes contact with electrolytic solution. The carbon nanotubes, after oxidation treatment, can be taken out of a cell and separated easily with water, organic solution (toluene or the like) and collected. The temperature of the electrolytic solution is 20° C.

According to a first aspect of the present invention, by applying an electric potential to nano-size elements, having a carbon network structure as an outer shell thereof, in electrolytic solution, an active portion in the nano-size substance is selectively destroyed. Consequently, the terminal ends can be removed from a carbon nanotube which is an example of a nano-size element.

Such an electrochemical treatment is capable of controlling the voltage applied to each electrode with an electric supply means such as a potentiostat. Further, because resistance of the nano-size element itself is small (less than 1Ω), uniform potential is applied to a nano-size aggregate so that reaction conditions for the entire nano-element aggregate are uniform. Thus, treatment with distribution of the reaction restricted to a small range, which is difficult for the conventional acid treatment or heat treatment, is achieved, so that an accurate reaction control necessary for selectively destroying the active portion of the nano-size substance is enabled.

According to a second aspect of the present invention, the nano-size elements having a carbon network structure as an outer shell include one or more elements selected from carbon nanotubes, fullerene, carbon nano-horns and modifications thereof.

The carbon nanotubes used in the present invention include single-walled carbon nanotubes which are microscopic hollow tubes of graphite in the form of a single atomic layer, namely graphene which is a rounded cylinder without any joint, its diameter being on the nanometer order, and multi-walled carbon nanotubes produced when two to 20 or 30 graphenes are overlaid, its diameter being in a range of 2 nm to 50 nm.

According to a third aspect of the present invention, each nano-size element which is treated in accordance with the present invention has an interior space substantially closed by an outer shell having a carbon network structure like the carbon nanotube mentioned above. By partially destroying the outer shell of such an element, the closed space is opened, so that the nano-size interior space becomes available.

According to a fourth aspect of the present invention, the chemically active portion (site) in the carbon network structure of the nano-size element is a five-membered ring or a seven-membered ring. For example, the straight cylinder wall of the carbon nanotube is formed of the six-membered carbon ring and the five-membered ring structure or the seven-membered ring structure is located at the end portion or bent portion. Because the five-membered ring and the seven-membered ring have a higher chemical reactivity (activity) than the six-membered ring, they are selectively destroyed by applying a voltage differential, so as to open the carbon nanotubes.

According to a fifth aspect of the present invention, the aforementioned oxidizing potential is 1.00 to 1.60 V (RHE). If this potential is applied, the active site of the nano-size substance is selectively destroyed. If the applied potential is less than 1.00 V (RHE), the reaction is slow and if the applied potential (RHE) exceeds 1.60 V, oxidation of the six-membered ring becomes a problem. More preferably, the applied potential is 1.20 to 1.60 V (RHE). Still more preferably, the applied potential is 1.35 to 1.50 V (RHE).

The active site of the carbon network structure of the nano-size element can also be selectively destroyed by reduction. In this case, the preferred reduction potential is −0.5 to −1.5 V (RHE).

Adjusting chemical/physical environments simultaneously with or before/after the aforementioned electrochemical treatment enhances destruction of the active site.

For example, a chemical pre-treatment can be carried out with a thin acid solution. It is also permissible to add an oxidant such as hydrogen peroxide solution, nitric acid, mixed acid, potassium permanganate or a reductant such as an alcohol, aldehyde, or hydrazine to the electrolytic solution. Using such an oxidant or reductant enhances the oxidizing reaction or reducing reaction. It is also permissible to heat to raise the reaction temperature.

In the alternative, it is permissible to apply ultrasonic wave and/or magnetic field instead of a voltage.

Those skilled in art will understand that if an oxidant or reductant is added, the applied voltage may be changed.

BRIEF DESCRIPTION OF THE DRAWINGS

These and other objects and technical advantages of the present invention will be readily apparent from the following description of preferred embodiments of the invention in conjunction with the accompanying drawings, in which.

DESCRIPTION OF THE PREFERRED EMBODIMENTS

Figure 1:
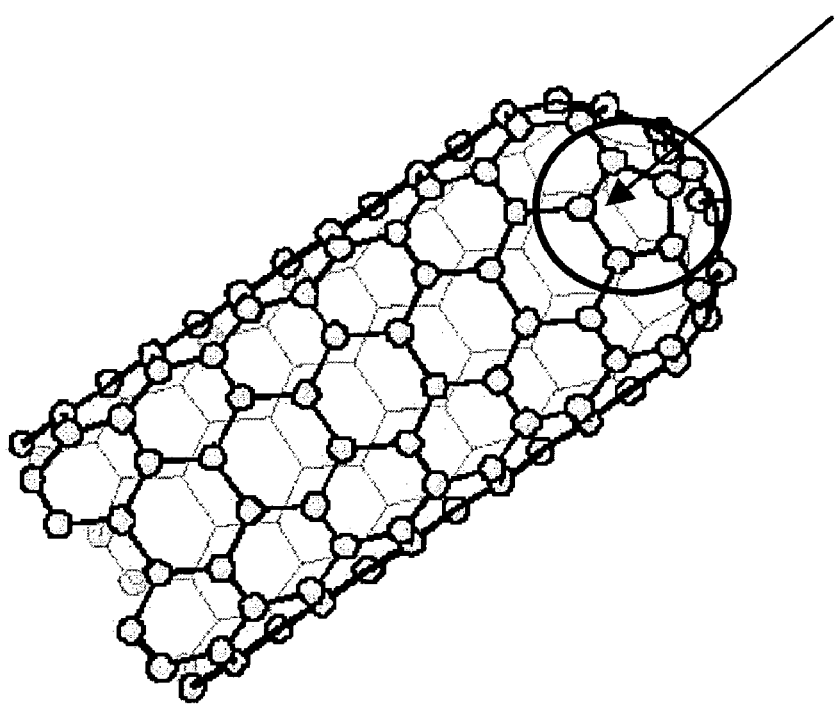
FIG. 1 is a schematic diagram showing the structure of the carbon nanotube.
Figure 2:
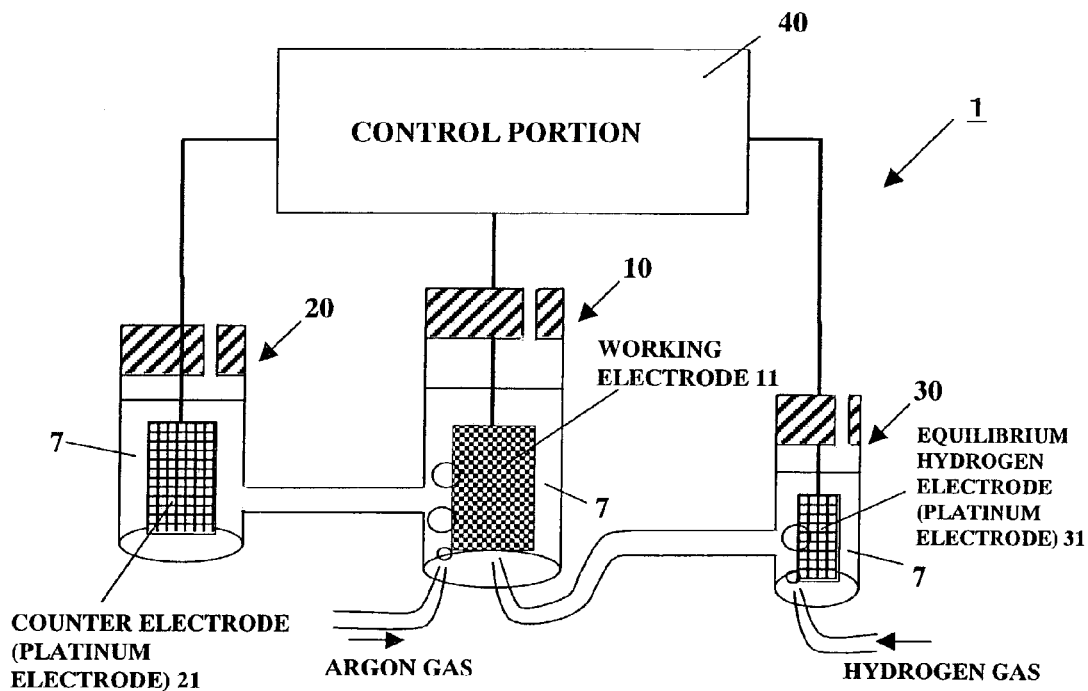
FIG. 2 is a schematic diagram showing the structure of an electrochemical apparatus in an embodiment of the invention.

FIG. 2 shows an example of an electrochemical oxidation treatment unit 1 in an embodiment of the present invention. This oxidation treatment unit 1 comprises a working electrode chamber 10, a counter electrode chamber 20, an equilibrium hydrogen electrode (RHE) chamber 30 and a control portion 40. The working electrode chamber 10 and the counter electrode chamber 20 communicate with each other through a pipe and the working electrode chamber 10 also communicates with the equilibrium hydrogen electrode (RHE) chamber 30 through a pipe. Each chamber is filled with a sulfuric acid solution (1.0 M) as electrolytic solution 7. As the electrolytic solution 7, it is also permissible to use an ordinary acid solution, alkali solution or normal salt solution. The experiments to be described here were carried out with the temperature of the electrolytic solution 7 set at room temperature (20° C.).

The working electrode 11 is placed in the working electrode chamber 10. Single-walled carbon nanotubes HiPCO purchased from Carbon Nanotechnologies Incorporated having 90% purity dispersed in toluene, were applied to a 4 cm$^2$ gold mesh (100-mesh screen) and by drying this net, a nanotube electrode was produced. The electrolytic solution for removing the ends of these carbon nanotubes, i.e. 18-20 mg of nanotubes contained in the electrode, was a 1.0M H$_2$SO$_4$ solution. The applied potential was pulse like and oxidation treatment was thereby carried out repeatedly.

Figure 3:
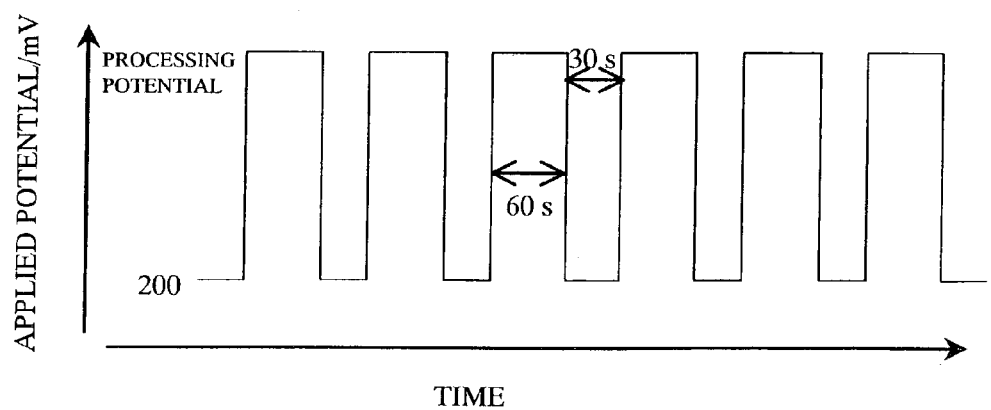
FIG. 3 is a graph of an example of a pulsed voltage applied to the carbon nanotubes.

FIG. 3 shows a pulse sequence of one embodiment. The oxidation treatment was carried out using 1.35 V and 1.50 V as applied potentials. At the bottom of the pulse cycle, the electric potential is about 200 mV. At a lower potential, oxygen is excessively generated at the counter electrode, which is undesirable.

The upper limit of applied potential is 1.50 V or 1.35 V while the lower limit thereof is 0.2 V (200 mV). The upper limit voltage was applied for 60 seconds and then the lower limit voltage was applied for 30 seconds and this cycle was repeated for one hour. The reason why a pulse sequence is employed is to prevent current flow from being stopped because electrolytic solution is consumed as the reaction progresses if the electric potential is supplied continuously.

The reason why argon gas is supplied is to prevent oxygen dissolved in the electrolytic solution from affecting the reaction. As a result, the accuracy and quality of the obtained data are improved.

Figure 4:
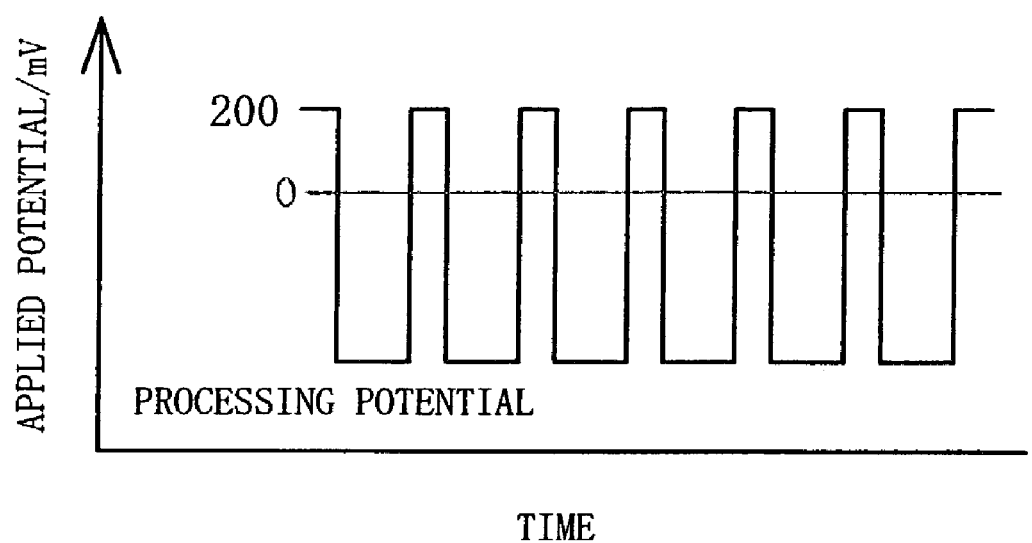
FIG. 4 is a graph of another example of pulsed voltage applied to the carbon nanotubes.

FIG. 4 shows the pulse sequence of another example. The example of FIG. 4 aims at removing the ends by applying a carbon nanotube with reduction potential, preferably −0.50 to −1.50 V (RHE).

As a result of NMR analysis for the applied potential, it was found that the upper limit for the applied potential is preferably 1.2 to 1.6 V (RHE) if the electrolytic solution is at room temperature (20° C.). More preferably, it is 1.35 to 1.50 V (RHE).

Those skilled in art can easily appreciate that the preferred applied potential may be adjusted up or down, depending on the temperature of the electrolytic solution.

FIGS. 5(A), 5(B) show cyclic voltammograms (CV) after oxidation treatment is executed at 1.35 V and 1.50 V respectively, with the state before the oxidation treatment indicated by solid lines and the state after the oxidation treatment indicated by dotted lines.

In the case where a sample is treated at 1.35 V, before the oxidation treatment is carried out, the amount of current increases rapidly from around 1.00 V on the abscissa of the graph (indicating that this portion is oxidized by CV) and this increase of the current is recognized up to near 1.60 V. The reason why the scanning potential is raised up to around 1.60 V is to compare currents at the upper limit of pulse potential near 1.35 V in FIG. 5(A).

Looking at the dotted lines, although current rises from around 1.20 V after the oxidation treatment, it does not increase as much as before the oxidation treatment.

The arrows indicate the upper potential of 1.35 V applied with pulse. If the portions of the curves at the upper limit potential are compared, whether or not oxidation is actually achieved can be determined. Even if the comparison is done at this point, it will be found that the carbon nanotube is more oxidized so that current does not flow easily under this cyclic voltammetry.

Looking at the dotted line in the case of a sample treated at 1.50 V, although current rises from around 1.20 V after the oxidation treatment, the current does not increase as much as before the oxidation treatment and, compared with the case of 1.35 V, current does not flow as easily. The arrow indicates the upper limit potential of 1.50 V applied with pulse. If the portions of the curves at the upper limit potential is compared, whether or not oxidation is actually achieved can be determined. Further, at this point, it is found that the carbon nanotube is more oxidized so that current does not flow as easily under this cyclic voltammetry. Further, because current flow is less at 1.50 V, which is a higher potential than 1.35 V, it can be estimated that the oxidizing force increases as the electric potential is increased.

Although there is some point where the current will increase in a sample subjected to oxidation treatment at an electric potential of below 1.0 V, the carbon nanotube is not oxidized because oxidation of carbon never occurs below 1.0 V (this has been confirmed with activated carbon) and it is considered that current originating from formation of electric double-layers is observed.

Figure 5:
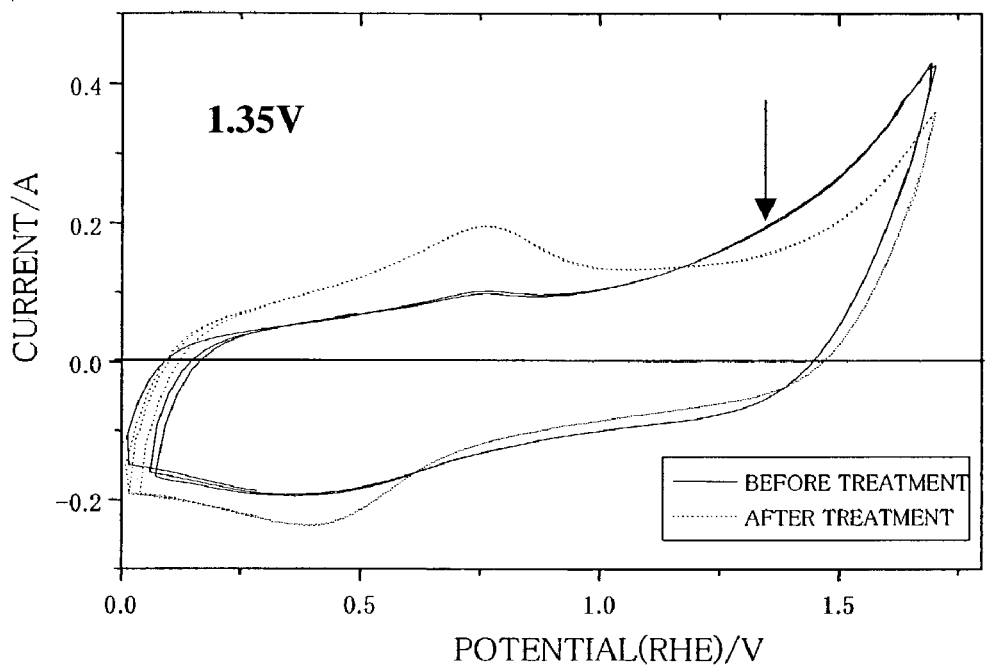
FIGS. 5(A), 5(B) are graphs of current versus voltage, cyclic voltammetry (CV), after oxidation treatment is carried out at 1.35 V and 1.50 V, respectively, wherein before oxidation treatment is indicated with solid lines and after oxidation treatment is indicated with dotted lines.
Figure 5:
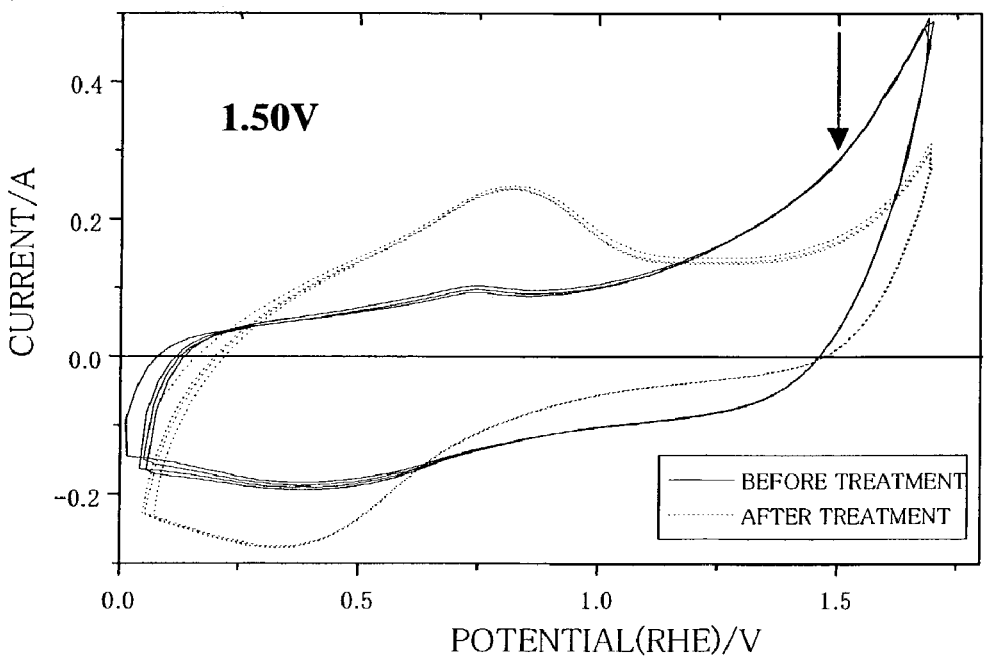

FIG. 5 is evidence that the carbon nanotube is oxidized electrochemically. Further, because the current is not zero, it is estimated that the five-membered ring or the seven-membered ring in the carbon nanotube is selectively oxidized while the six-membered ring remains unoxidized.

FIG. 5(A) shows a sample treated at 1.35V and the integrated amount of oxidizing charge applied at this time is 39 C (20.3 mg in terms of nanotube amount). FIG. 5(B) shows a case where the treatment is carried out at 1.50 V and the integrated value of the applied charge at this time is 176 C (21.0 mg). Oxidizing current in an applied potential range (indicated with an arrow) decreases as between before and after treatment, which indicates that an irreversible oxidation reaction has occurred.

$^{129}$Xe NMR measurement was carried out on samples processed at pulsed 1.35 V and 1.50 V as in FIG. 3 and compared with an untreated sample in order to recognize the effect of opening the carbon nanotubes. With these measurements, information about pore size (d<5 nm) in the sample can be obtained from the Xe chemical shift value.

Pressure dependence of the $^{129}$Xe NMR chemical shift (δ) is measured. The δ is shifted to the lower side of the magnetic field as Xe gas pressure increases and the pore size is evaluated based on a value extrapolated at 0 atmospheric pressure.

Figure 6:
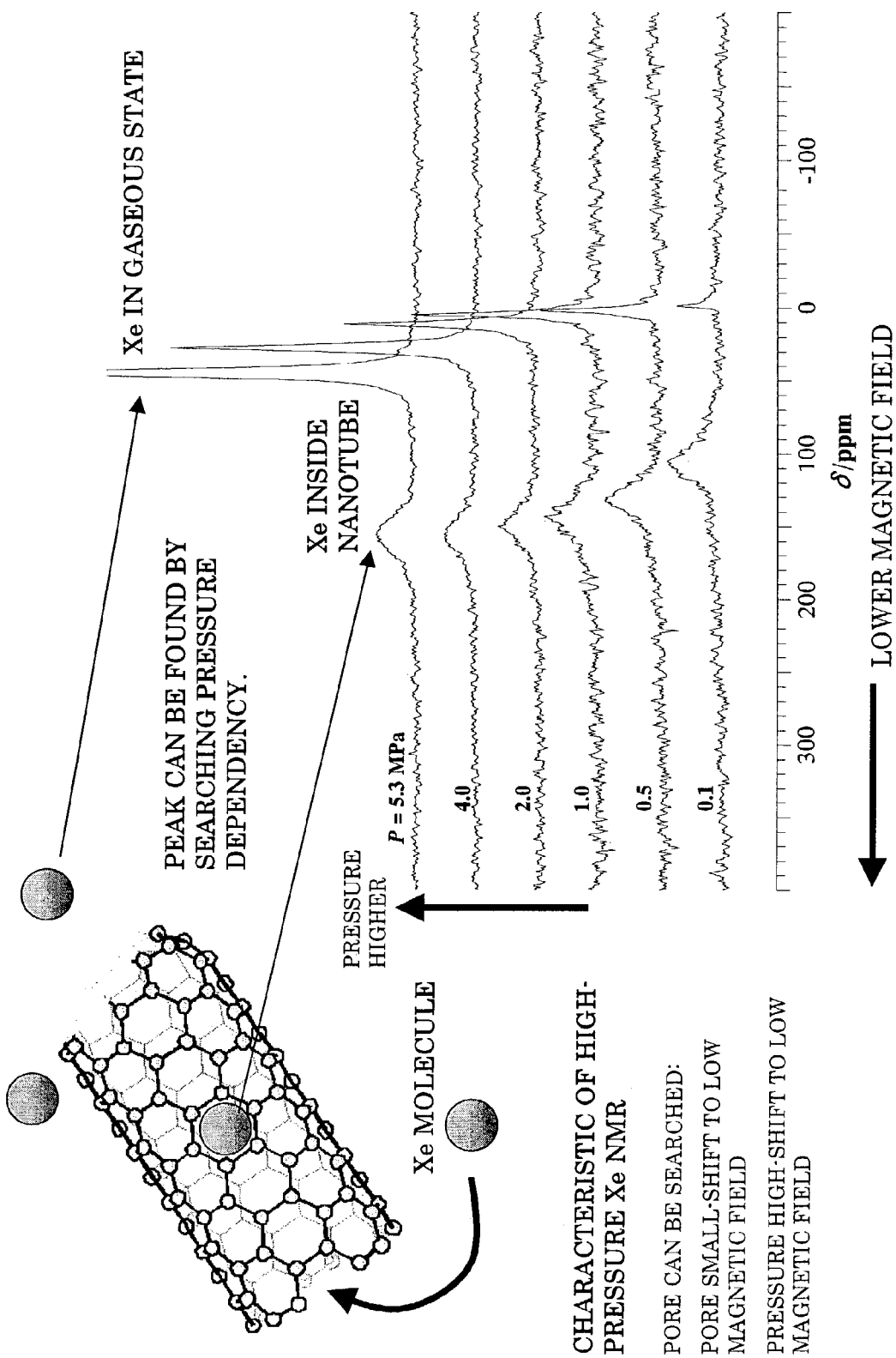
FIG. 6 is a diagram showing pore distribution as determined with Xe NMR.

That is, the pore size becomes smaller as the chemical shift value nears the lower side of the magnetic field and larger as the value nears 0 ppm. Data is available for the pore sizes and chemical shift values of activated carbon having a narrow pore distribution, zeolites and polymers. If Xe chemical shift values before/after electrochemical oxidation treatment of the carbon nanotube are compared with the reported data and examined, removal of the ends of carbon nanotubes can be recognized. FIG. 6 shows this schematically.

$^{129}$Xe NMR spectra were recorded with a single pulse sequence and a 3 μs pulse width using a Bruker MSL-200 type spectrometer at the Lamor frequency of 55.57 MHz. The measurement was carried out in a pressure range of 0.05 to 5.30 Mpa. The sample temperature at the time of measurement was kept at 298° K.

A sample of about 40 mg was put into a NMR tube 5 mm in diameter, 25 mm long and fixed with quartz wool. After vacuum degassing for an hour at 200° C., the sample was set at a high-pressure Xe NMR dedicated probe (Chem. Phys. Lett., 340 (2001) 473.). Then, after vacuum degassing of the sample for an hour at 298° K, Xe gas was adjusted to a desired pressure and $^{129}$Xe NMR measurement was made. In this measurement, Xe gas was introduced to the probe through a pipe as required and the pressure dependency of NMR spectrum was investigated.

Figure 7:
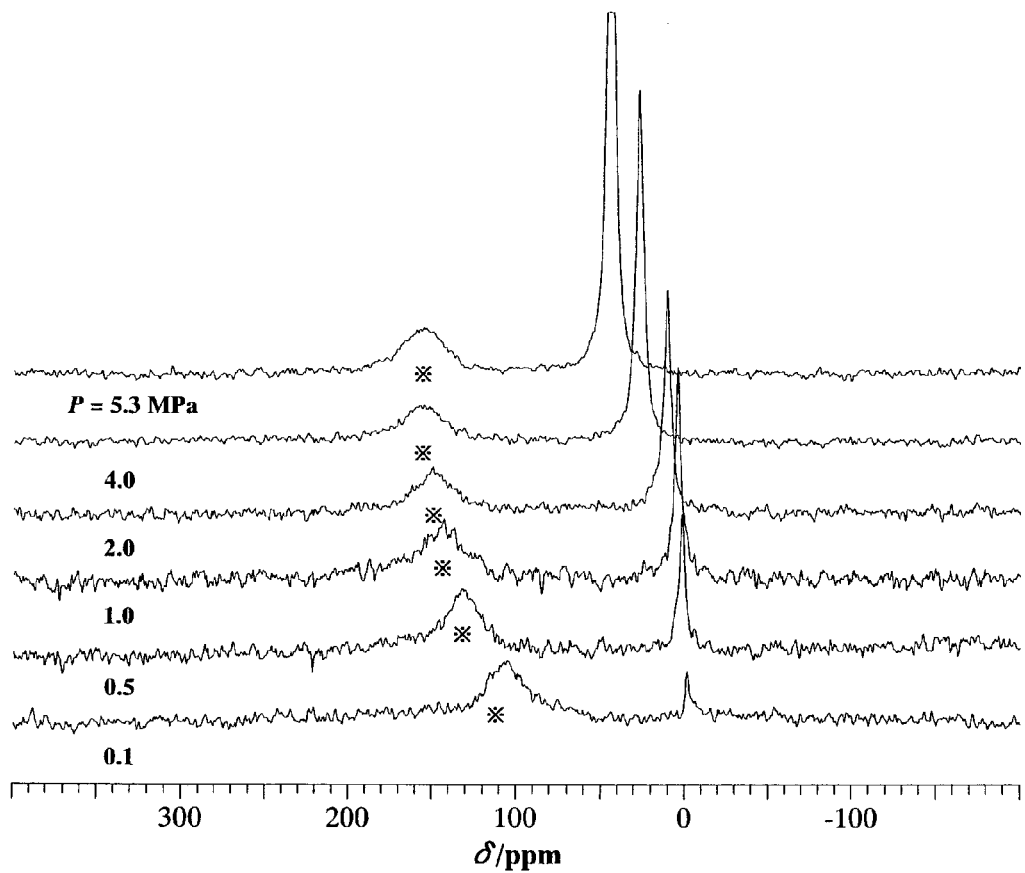
FIG. 7 shows a Xe NMR spectrum of a sample treated at 1.35 V.
Figure 8:
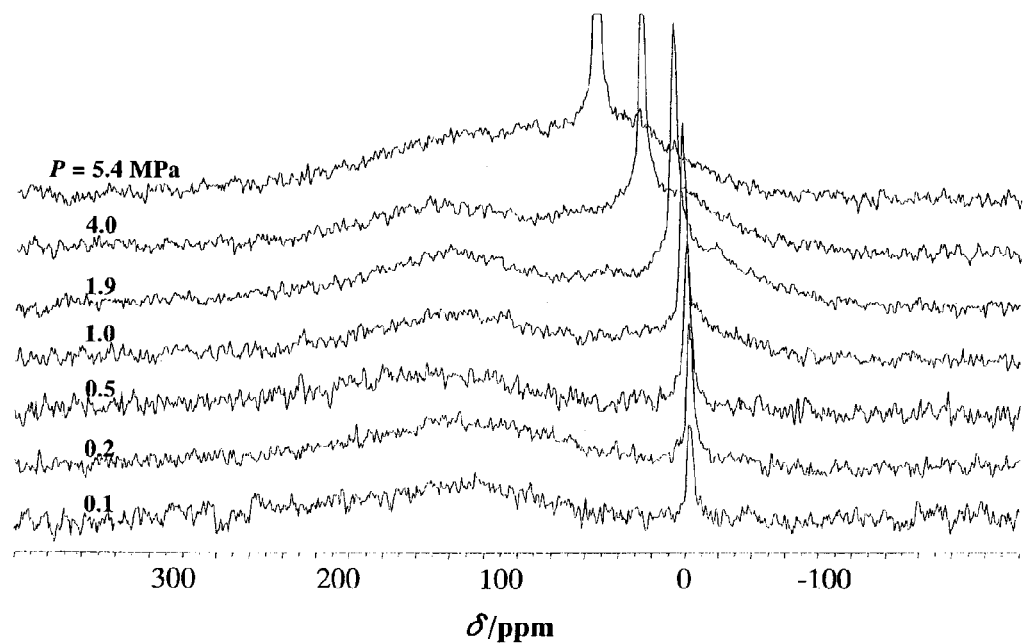
FIG. 8 shows a Xe NMR spectrum of an untreated sample.

FIG. 7 shows measurements for the sample treated at 1.35 V and FIG. 8 shows measurements for a sample before treatment. In the sample treated at 1.35 V, a peak (indicated with *), considered to have originated from Xe adsorbing into micropores, was observed on the low side of the magnetic field and changed toward a lower magnetic field as pressure increased. This pressure dependency, which is observed when a single micro or meso pore exists in a sample, is a characteristic pressure dependency found in Xe NMR. In this measurement, repeating time was set to 1 s and the peak strength of adsorbed Xe was substantially the same compared with the case of 5 s. Spin-lattice relaxation time (T1) is considered to be shorter than 1 s. A sharp peak around 0 ppm originated from free Xe in gaseous condition.

On the other hand, because the pressure dependency as shown in FIG. 7 is not found in a sample before electrolytic treatment and the peak of the adsorbed Xe is much broader than the case of a treated sample, it is considered that no pore uniformity exists. The observed peak is considered to have originated from Xe adsorbing in gaps between nanotube bundles or between nanotubes. The reason why the specific surface area of a sample before processing is as large as 700 $m^2/g$ is that there exist a large number of the aforementioned gaps.

Figure 9:
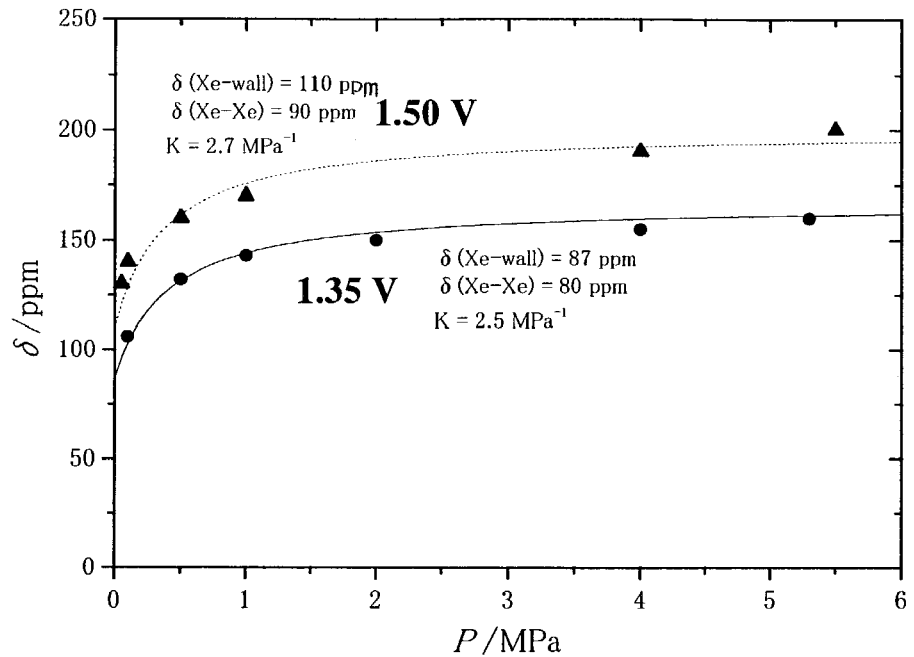
FIG. 9 is a graph showing pressure dependence of the Xe chemical shift value relative to voltage.

As regards the peak of the adsorbed Xe shown in FIG. 7, changes in chemical shift value relative to pressure are indicated by black marks in FIG. 9. Although the chemical shift value changes to a lower magnetic field in a region in which pressure is 0.1 to 1.0 MPs, the change in a higher-pressure region is small. Recently, Ueda et al. have reported results of their investigation of pressure dependence of the Xe NMR chemical shift value in a system in which Xe adsorbs in pores of activated carbon fiber (ACF) and reported that this pressure dependence could be analyzed assuming Langmuir type adsorption. That is, the chemical shift value δ(P) has a relation expressed by the following equation with the shift arising from the collisions between Xe and walled-surface δXe-wall, the value relating to the density of the Xe in the pore $δXe-Xe^{max}$, and K is the equilibrium constant between the Xe adsorbed into the pore and the Xe gas.

Equation 1

For the sample processed at 1.35 V (triangles), the result of simulation with δXe-wall=87 ppm, $δXe-Xe^{max}$=80 ppm, K=2.5 Mpa$^{-1}$ is shown by a solid line in FIG. 9. The result for a sample processed at 1.50 V is indicated by the dotted line. At this time, the conditions were δXe-wall=110 ppm, $δXe-Xe^{max}$=90 ppm, K=2.7 Mpa$^{-1}$. The value δXe-wall extrapolated to 0 atmospheric pressure corresponds to the size of a pore with adsorbed Xe. According to the research done by Ueda et al., it was found that δXe-wall was 95 ppm if the pore was 1 nm, 80 ppm if 1.5 nm and 71 ppm if 2.0 nm. It was empirically confirmed that the Xe NMR chemical shift value is inversely proportional to the diameter (d) of the pore (Chem. Phys. Lett., 136, (1987) 314.).

Figure 10:
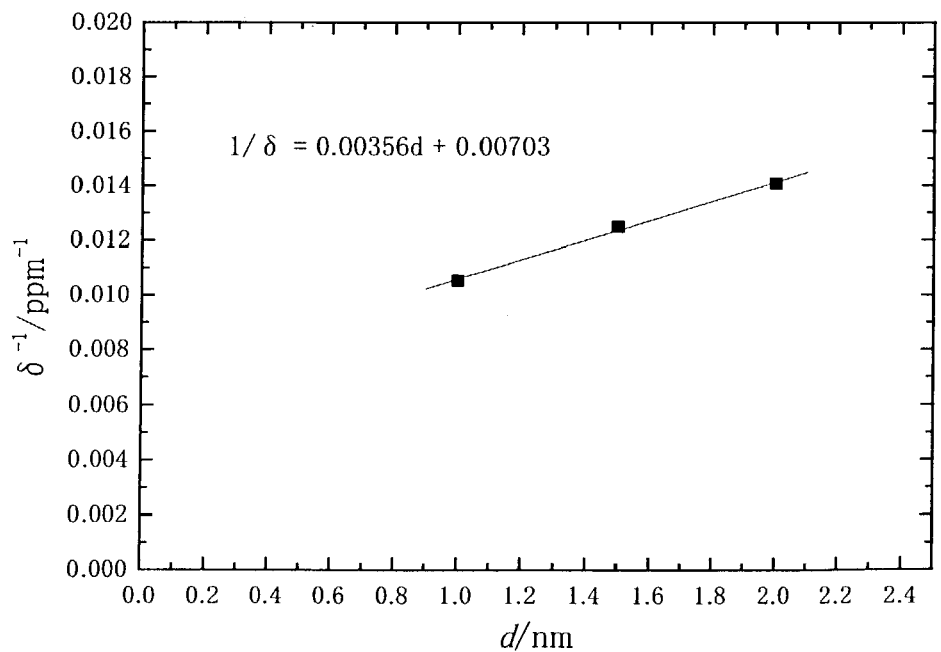
FIG. 10 is a graph showing the result of plotting pore diameter against the inverse of δ.

In FIG. 10, the results of ACF are shown, with a value for inverse of δ plotted with respect to the diameter of the pores. A very excellent linearity is indicated in the region of the diameter of the pore so that a regression curve is produced, and is expressed with a solid line in FIG. 10. The diameters of the pores, as obtained from the value of δXe-wall of this embodiment, were 1.2 nm (1.35 V) and 0.6 nm (1.50 V). Because the purity of carbon nanotube contained in the sample is about 90% and the pore diameters varied within the range of 0.9 to 1.4 nm, it is concluded that the Xe absorption site is inside the nanotube.

Because as a result of example 2, a peak for xenon contained in the carbon nanotube was found, and the opening of the carbon nanotubes was confirmed.

By a new electrochemical method capable of achieving accurate, uniform treatment, the removal of the ends of the carbon nanotubes, while maintaining the cylindrical structure, is achieved. Consequently, the yield of the open-ended carbon nanotube is improved, thereby making it possible to reduce production cost thereof.

Use of the internal space inside the carbon nanotube enables provision of novel functional materials such as gas-absorbing materials which physically absorb a large amount of hydrogen, methane or the like, gas separating material for use in the pressure swing adsorption (PSA) technique, a novel anode for a lithium ion cell, and an electrode material in the form of an electrochemical super capacitor having a large internal capacity for containing an electrolyte.

As described above, according to the present invention, accurate reaction control is enabled by selectively destroying an active portion in the network structure of carbon in nano-elements using an electrochemical method. Consequently, the yield of the treatment is improved, and cost performance is raised.

The present invention is not restricted to the above-described embodiments. The present invention includes various modifications not departing from the scope of claims and within a range easily imagined by those skilled in the art.

We claim:

1. A method for opening ends of carbon nanotubes in the form of carbon network structures to introduce some substance into a hollow interior space of the nanotubes, each nanotube having a cylindrical portion defining the hollow interior space and opposing end portions closing the hollow interior space, the method comprising:

applying the nanotubes onto a screen to form, an electrode structure including the screen and the nanotubes as an aggregate;

immersing the electrode structure, with the aggregated nanotubes, into an electrolyte solution; and applying an electric potential intermittently to the electrode structure while immersed in the electrolyte solution to selectively destroy the end portions of the nanotubes while maintaining the cylindrical portions of the nanotubes.

2. The method as claimed in claim 1 wherein the cylinder portion is composed mainly of six-membered ring structures and the end portions are formed of a five-membered ring structure or a seven-membered ring structure.

3. The method as claimed in claim 1 wherein said potential is an oxidizing potential of 1.00 to 1.60 V (RHE).

4. The method as claimed in claim 1 wherein said potential is an oxidizing potential of 1.20 to 1.60 V (RHE).

5. The method according to claim 1 wherein the electric potential is applied between the electrode structure and a counter electrode immersed in the electrolyte solution.

6. The method as claimed in claim 1 wherein said potential is an oxidizing potential of 1.35 to 1.50 V (RHE).

7. The method as claimed in claim 1 wherein said end portions are fullerene semi-spheres with five-membered rings.

* * * * *